United States Patent
Claus et al.

(10) Patent No.: US 6,905,069 B2
(45) Date of Patent: Jun. 14, 2005

(54) OPTICAL SENSOR

(75) Inventors: Armin Claus, Nürtingen (DE); Thomas Dümmel, Hülben (DE)

(73) Assignee: Leuze Electronic GmbH & Co., Owen/Teck (DE)

(*) Notice: Subject to any disclaimer, the term of this patent is extended or adjusted under 35 U.S.C. 154(b) by 0 days.

(21) Appl. No.: 10/693,456

(22) Filed: Oct. 27, 2003

(65) Prior Publication Data

US 2004/0084532 A1 May 6, 2004

Related U.S. Application Data

(63) Continuation of application No. 10/427,995, filed on May 2, 2003, now abandoned.

(30) Foreign Application Priority Data

May 2, 2002 (DE) .......................................... 102 19 529

(51) Int. Cl.[7] .............................. G06K 7/10; G06K 7/14
(52) U.S. Cl. ....................................... 235/454; 235/439
(58) Field of Search ................................ 235/454, 439, 235/462.36–462.43

(56) References Cited

U.S. PATENT DOCUMENTS

| | | | |
|---|---|---|---|
| 5,194,721 A | * 3/1993 | Chu ............................ | 235/454 |
| 5,659,432 A | 8/1997 | Takashima et al. | |
| 5,979,761 A | * 11/1999 | Wurz et al. .................. | 235/454 |
| 6,581,838 B1 | * 6/2003 | Meksavan et al. ..... | 235/462.46 |
| 6,766,957 B2 | * 7/2004 | Matsuura et al. ...... | 235/462.45 |

FOREIGN PATENT DOCUMENTS

| | | |
|---|---|---|
| DE | 198 44 238 A1 | 4/2000 |
| EP | 0 450 643 A2 | 10/1991 |
| JP | 11282954 A | 10/1999 |
| WO | WO 93/06514 A1 | 4/1993 |

OTHER PUBLICATIONS

Peter Chall, "Focusing semiconductor laser diodes in barcodes readers", Electronic Components and Applications, Eindhoven, NL, vol. 9, No. 2, 1989, pp. 101–106, XP000073926.

Miyazaki et al., "Autofocussing Type Barcode Reader OBR–70–7AF with Advanced Beam Forming and Decoding Techniques Omnidirectional Reading in Great Depth of Field", NEC Research and Development, Nippon Electric LTD., Tokyo, JP, vol. 34, No. 2, 1993, pp. 239–247, XP000322017.

* cited by examiner

Primary Examiner—Thien M. Le
Assistant Examiner—Edwyn Labaze
(74) Attorney, Agent, or Firm—Venable LLP; Robert Kinberg

(57) ABSTRACT

An optical sensor includes a transmitter that emits light rays. Transmitting optics are installed downstream of the transmitter. An adjustment device is operatively arranged for reversibly adjusting, in three spatial directions, the relative position of the transmitter and the transmitting optics. A receiver receives light rays. An evaluation unit evaluates the received signals that are present at the receiver output.

21 Claims, 4 Drawing Sheets

OPTICAL SENSOR

CROSS-REFERENCE TO RELATED APPLICATION

The present application is a continuation of U.S. patent application Ser. No. 10/427,995 filed May 2, 2003 entitled "Optical Sensor," to Armin Claus et al, and claiming priority to German Patent Application No. 102 19 529.3 filed May 2, 2002, the priority of which is also claimed herein. The contents of both of foregoing applications are incorporated herein by reference in their entirety.

BACKGROUND OF THE INVENTION

1. Field of the Invention

The present invention relates generally to an optical sensor, and more particularly to an adjustable optical sensor.

2. Related Art

In general, optical sensors can be embodied as light barriers, light scanners and distance sensors. In particular, the optical sensors can be barcode readers for detecting barcodes or, in general, for detecting markings with contrasting patterns.

Optical sensors of this type generally use transmitting optics or a standard optical system for generating a beam with the transmitting light rays emitted by the transmitter. To generate the desired beam with the transmitting light rays, in particular for focusing the beam and guiding the rays along a specific beam axis, the transmitting optics must be aligned relatively precisely and reproducibly.

During the process of manufacturing the optical sensor, the transmitter and the transmitting optics are installed inside a housing with an integrated optical sensor by using production steps that are typically carried out manually.

An optical sensor of this type is described in German patent document 198 44 238 A1. The optical sensor embodied as barcode reader is integrated into a housing, and an insert can be inserted into the housing for accommodating the optical components.

The housing insert is provided with a hollow-cylindrical receptacle in which the transmitter and the transmitting optics are positioned, one behind the other and spaced apart.

The disadvantage of this arrangement is that the installation locations for the transmitter and the transmitting optics are preset, thus making it impossible to adjust the beam course for the transmitting light rays. In particular, no subsequent corrections are possible in case of a faulty installation position of the components, because the transmitter and transmitting optics normally must be glued on for securing them inside the receptacle.

SUMMARY OF THE INVENTION

It is an object of the invention to provide an optical sensor of the aforementioned type, which provides a reliable adjustment option with high flexibility for adjusting the beam guidance of the emitted light rays.

The above and other objects are accomplished according to the invention by the provision of an optical sensor comprising a transmitter that emits light rays, a receiver that receives light rays and an evaluation unit for evaluating the receiving signals present at the receiver output. An adjustment device is assigned to the transmitter, which permits a reversible adjustment in three spatial directions of the relative position of the transmitter and a transmitting optic installed downstream of the transmitter.

The device according to the invention makes it possible to preset the beam guidance of the transmitting light rays in a flexible manner. For this, the reversible adjustment is particularly advantageous because the beam guidance can be changed if necessary.

The beam profile for the transmitting light rays as well as their focussing position can be changed through adjusting the distance between transmitter and transmitting optics. A precise adjustment of the beam direction for the transmitting light rays is possible through positioning the transmitter or transmitting optics transversely to the transmitter axis.

The adjustment device of one advantageous embodiment comprises an optics holder in which the transmitting optics are positioned so as to be displaceable. In a first embodiment of the invention, the transmitting optics in the holder are positioned such that they can pivot in a plane that is oriented perpendicularly to the axis of the transmitting light beam, thus making it possible to adjust the beam direction of the transmitting light rays. The transmitter is positioned such that it can be displaced relative to the transmitting optics in order to preset the beam profile and focussing position of the transmitting light rays.

According to a particularly advantageous second embodiment of the invention, the transmitting optics inside the holder can be adjusted in all three spatial directions. As a result, the transmitter can be arranged locally secured inside the optical sensor. The beam direction in that case is preset through a pivoting movement of the optics holder transverse to the optical axis of the transmitter. Adjusting the beam profile and the focussing position is usefully achieved by deflection of the optics holder with respect to a predetermined reference point.

In each case, the optics holder is secured in a specified adjustment position with the aid of mechanical fixing and fastening systems, wherein the adjusted position can be released again at any time by activating the fixing and fastening systems.

In an exemplary embodiment, the present invention can be an optical sensor comprising: a transmitter that emits light rays; transmitting optics installed downstream of the transmitter; a receiver that receives light rays; an evaluation unit for evaluating the received signals that are present at the receiver output; and an adjustment device operatively arranged for reversibly adjusting, in three spatial directions, the relative position of the transmitter and the transmitting optics.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Figure 1:
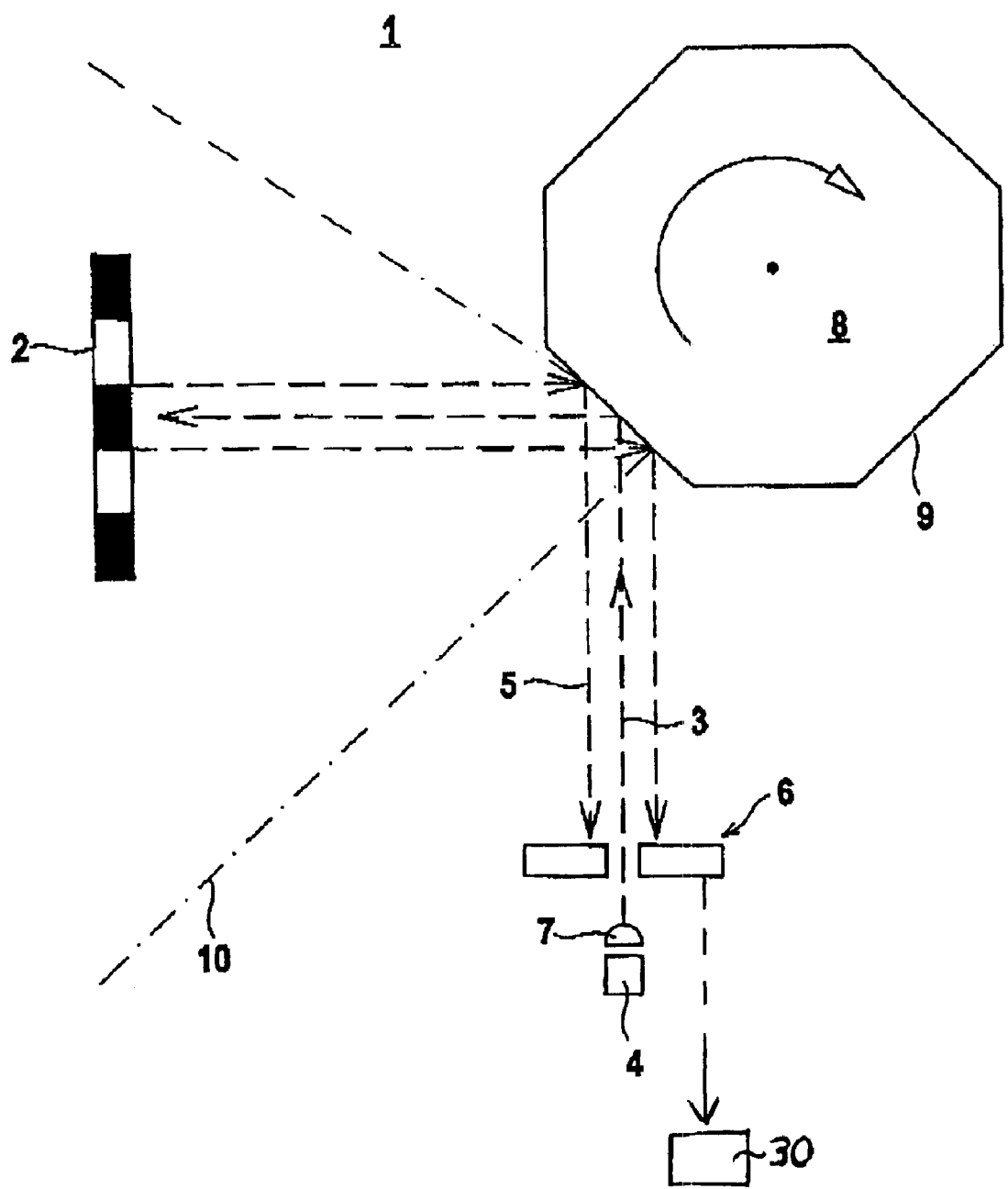
FIG. 1 depicts a schematic representation of an exemplary embodiment of an optical sensor embodied as barcode reader according to the present invention.

FIG. 1 schematically shows the essential components of an optical sensor 1 according to the present invention, embodied as barcode reader. The optical sensor 1 is used for detecting barcodes 2 or, in general, for detecting markings with contrasting patterns. In principle, the optical sensor 1 can also be embodied as a light barrier, a light scanner, a distance sensor or the like.

The barcode reader according to FIG. 1 comprises a transmitter 4 that emits light rays 3 and a receiver 6 that receives light rays 5. The transmitter 4, preferably a laser diode, is followed by transmitting optics 7 for generating a beam with the transmitting light rays 3 and focusing these rays.

The transmitting light rays 3 that are emitted by the transmitter 4 and the receiving light rays 5 that are reflected back by a barcode 2 are guided over a deflection unit. In an exemplary embodiment, the deflection unit is a motor-driven polygonal mirror wheel 8 with a predetermined number of facet-shaped mirror surfaces 9.

As a result of the rotational movement of the polygonal mirror wheel 8, the transmitting light rays 3 are periodically guided across a monitoring range 10, which extends in a scanning plane. The monitoring range 10 extends across a specific angle region that is predetermined by the number of mirror surfaces 9 of the polygonal mirror wheel 8.

The received signals present at the output of the receiver 6 are amplified in an amplifier that is not shown herein and evaluated in an evaluation unit 30.

The received light rays 5, which are reflected by the barcode 2, are amplitude-modulated according to the sequence of black and white line elements in the barcode 2. The received signals present at the output of the receiver 6 are correspondingly amplitude-modulated. The analog, amplitude-modulated receiving signals are evaluated in an evaluation unit 30 with a threshold value unit. Binary signal sequences are generated as a result, which are used to detect the barcode 2 through a comparison with stored contrast patterns for barcodss 2.

Figure 2:
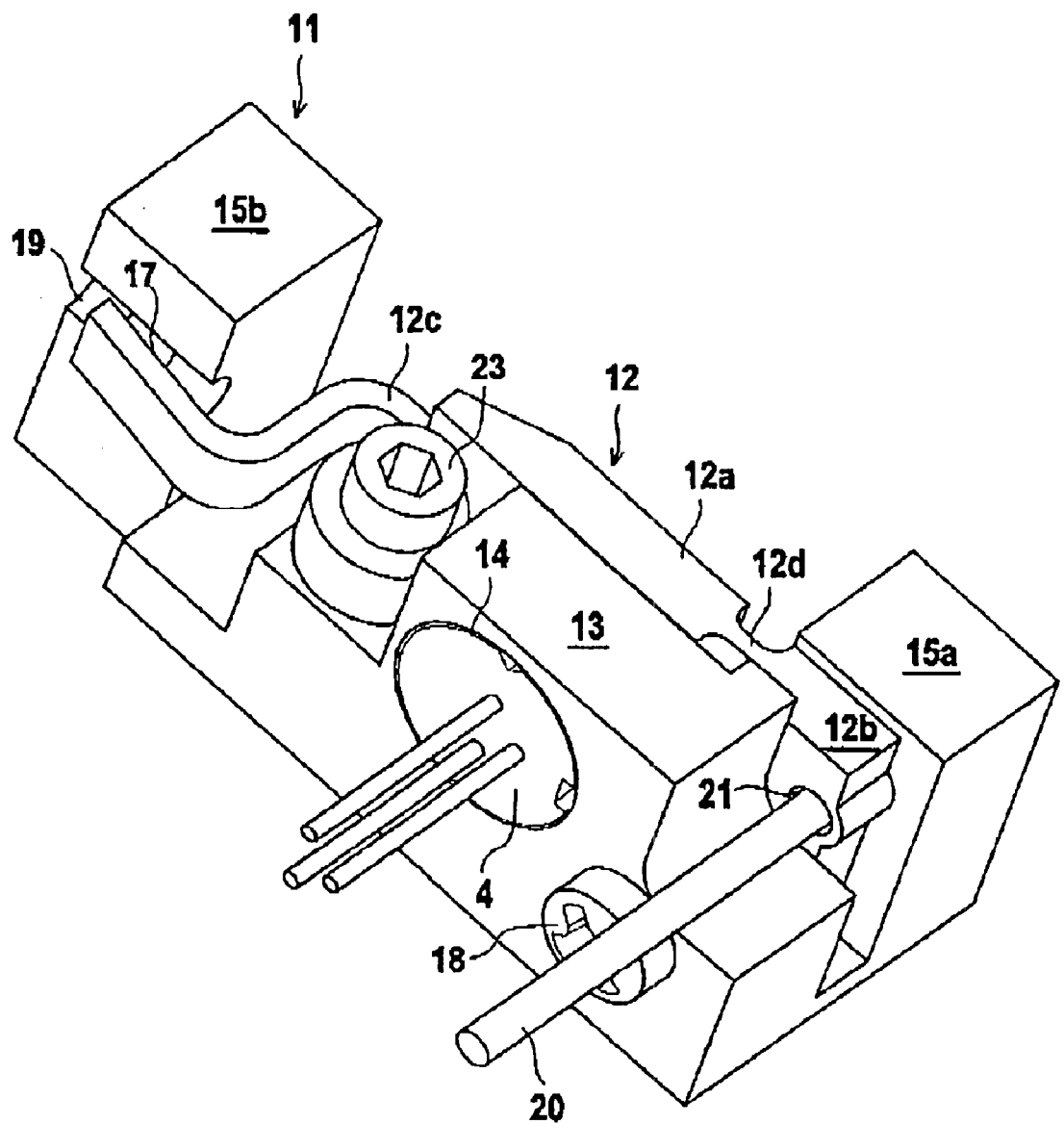
FIG. 2 is a perspective representation of the adjustment device for the optical sensor according to FIG. 1.
Figure 3:
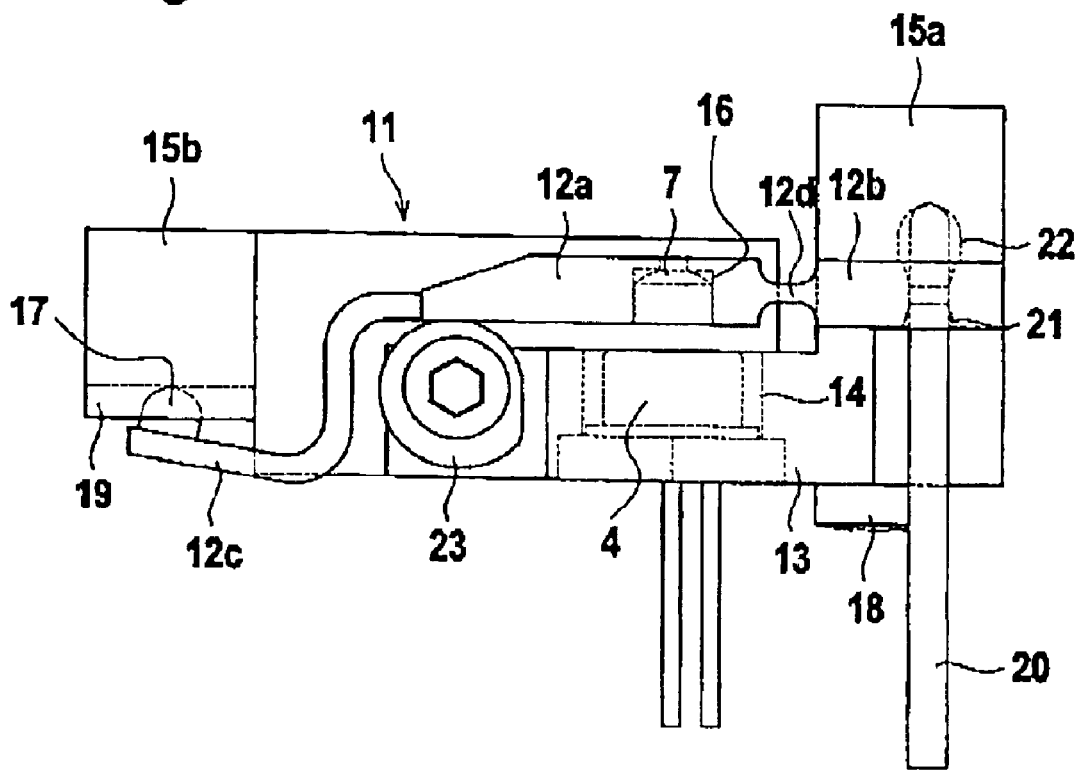
FIG. 3 depicts a cross section through the adjustment device according to FIG. 2.

A housing insert 11 is provided for accommodating the optical components of the optical sensor 1 according to the FIG. 1. This insert is integrated into the optical sensor 1 housing, which is not shown herein. FIGS. 2 and 3 show a detail of this housing insert 11 with an adjustment device for adjusting the relative position of the transmitter 4 and the transmitting optics 7.

Figure 4:
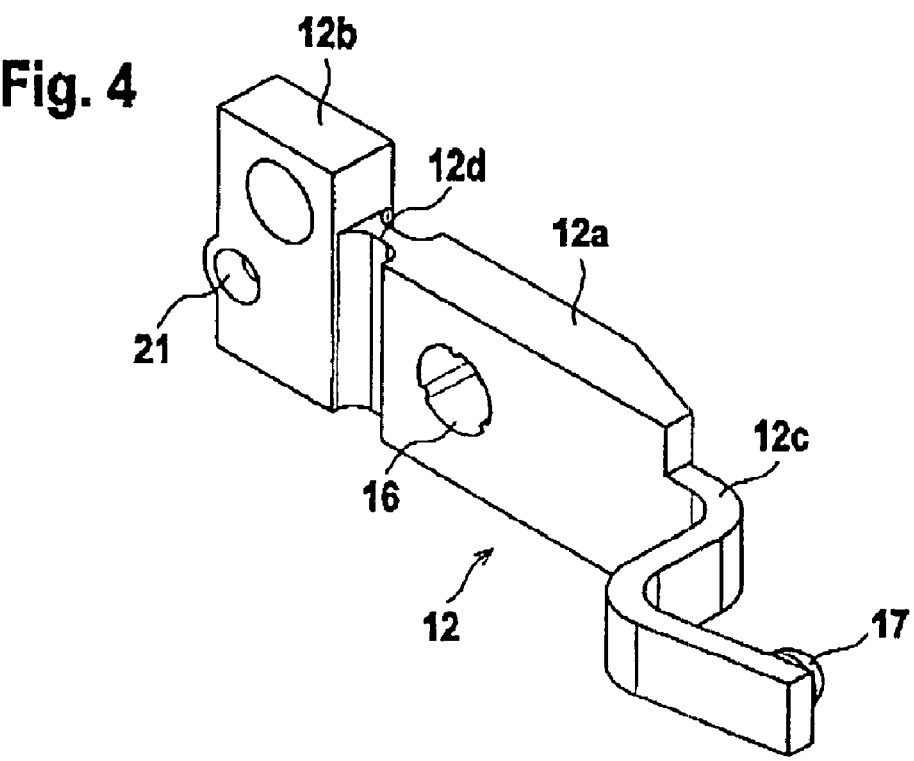
FIG. 4 is a perspective view of the optics holder for the adjustment device according to FIGS. 2 and 3.

The adjustment device comprises an optics holder 12 for accommodating the transmitting optics 7. The optics holder 12, shown separately in FIG. 4, is positioned such that it can move on the housing insert 11, whereas the transmitter 4 is locally secured to the housing insert 11.

The detail of housing insert 11 that is shown in FIGS. 2 and 3 shows another insert 13 with a bore 14, in which the transmitter 4 is positioned. The housing insert 11 furthermore has a first and second holding part 15a, 15b for positioning the optics holder 12. The holding parts 15a, 15b are essentially cube-shaped elements that project perpendicularly from the bottom of the housing insert 11.

The optics holder 12 can be a molded plastic part, the center piece of which forms a support element 12a for accommodating the transmitting optics 7. The transmitting optics 7 in this case are positioned on a bore 16 that extends through the support segment 12a.

Holder segments 12b, 12c adjoin the longitudinal ends of the support segment 12a and also form components of the optics holder 12. The first holder segment 12b has a plate-shaped design and is positioned so as to be displaceable on the level support surface for the first holding part 15a, which extends in a vertical plane and is assigned to the insert 13. The first holder segment 12b is connected via a flexible element 12d to the support segment 12a. The flexible element 12d is formed by a structural weakness in the area where the wall thickness of the optics holder 12 is reduced considerably. The flexible element 12d forms a resilient spring that can serve to bend the support segment 12a relative to the first holder segment 12b.

For a position change, the first holder segment 12b can be displaced on the support surface of the first holding part 15a, wherein the displacement movement occurs in the vertical plane of the support surface and thus perpendicularly to the horizontally extending optical axis of the transmitter 4. The second holder segment 12c is positioned such that it can turn on the second holding part 15b. The second holder segment 12c is essentially a leg forming a right angle, wherein a rotary head 17 for the rotational positioning on the second holding part 15b is provided on the front end of the leg, at the free end of the second holder segment 12c. The leg of the holder segment 12c forms a resilient element.

The optics holder 12 that is positioned on the holding parts 15a, 15b adjoins the front of the insert 13, so that the transmitting optics 7 in the insert 13 are positioned at a predetermined distance to the transmitting optics 7 in the optics holder 12. The first holder segment 12b is located inside a recess between the front portions of the insert 13 and the support surface of the holding part 15a. A fixing screw 18 that extends through the side edge of insert 13 is used to secure the optics holder 12 in a certain adjustment position. The first holder segment 12b in this case is secured in the recess between insert 13 and the first holding part 15a by turning the fixing screw 18.

The other side of the optics holder 12 is secured to the second holding part 15b through the rotational positioning of the second holder segment 12c. For this, the rotary head 17 is positioned on the second holder segment 12c, inside an indentation 19 on the support surface of the second holding part 15b that faces the insert 13 and extends in a vertical plane. This indentation 19 extends in horizontal direction across the complete width of the second holding part 15b. The indentation 19 has a constant semi-circular cross section in the longitudinal direction. The radius of the indentation 19 is adapted to the radius of the rotary head 17.

The longitudinal axis of the optics holder 12, arranged on the holding parts 15a, 15b, also extends in the horizontal direction, wherein the longitudinal axis of the optics holder 12 is positioned perpendicularly to the optical axis of the transmitter 4.

The position of the optics holder 12 relative to the insert 13 can be changed as specified to adjust the relative position of the transmitter 4 and the transmitting optics 7.

An operating element in the form of a rod-shaped lever 20 is provided to vary the position of the transmitting optics 7 in a vertical plane that extends perpendicularly to the optical axis of the transmitter 4. The lever 20 is disposed in a bore 21 of a first holder segment 12b of the optics holder 12, wherein the bore 21 extends in axial direction through the first holder segment 12b. The cross section of bore 21 narrows down in the center of the first holder segment 12b. Starting with this narrowed down cross-section, the diameter of the bore 21 continuously expands toward the locations where it exits on the front and back of the first holder segment 12b. A recess 22 that exits at the support surface is furthermore provided in the first holding part 15a for accommodating the lever 20. The recess 22 has an essentially hemispherical design, wherein its diameter at the support surface is somewhat larger than the diameter of the lever 20. To adjust the position of the transmitting optics 7, the lever 20 is inserted into the bore 21 of the first holder segment 12b, so that the front end of lever 20 that projects over the first holder segment 12b engages in the recess 22 in the first holding part 15a.

The position of the lever inside the receptacle is changed through moving the back end of the lever 20. In the process, the first holder segment 12b is deflected in the plane for the support surface through the guidance of the lever 20 inside the bore 21. As a result of the cone-shaped design of the bore 21, the deflection movement of the lever 20 is continuously converted to a pivoting movement of the holder segment 12b and thus moves the complete optics holder 12. With this pivoting movement, the optics holder 12 is pivoted relative to the pivoting axis predetermined by the rotary head 17. In addition, the rotary head 17 is displaced in the second holding part 15b, if necessary along the indentation 19. As soon as the desired adjustment position of the optics holder 12 is reached, this holder is secured on the insert 13 with the fixing screw 18.

An eccentric element 23 is provided for adjusting the position of the transmitting optics 7 in the direction of the optical axis for the transmitter 4. The eccentric element 23 takes the form of an eccentric plate and is positioned on the side relative to the insert 13, with the rotational axis extending in vertical direction. The outer surface of the eccentric plate rests against the back of the optics holder 12, in the region of the support segment 12a end, which is facing the second holding element 12c. A wrench or similar tool is attached to the surface and used to turn the eccentric plate around the plate's rotational axis, which changes the contact pressure exerted onto the optics holder 12 in accordance with the shape of the eccentric plate.

The optics holder 12 is bent in the region of flexible element 12d by changing the contact pressure. As a result, the support segment 12a is pivoted in horizontal direction and the transmitting optics 7 are either moved toward or away from the transmitter 4. The respectively adjusted position of the optics holder 12 is secured by the eccentric plate 23 since the eccentric plate 23 presses the first holder segment 12b with the rotary head 17 into the indentation 19. As a result of the springy effect of the leg of the holder segment 12c, a contact spring is formed that pushes against the eccentric plate 23.

Figure 5:
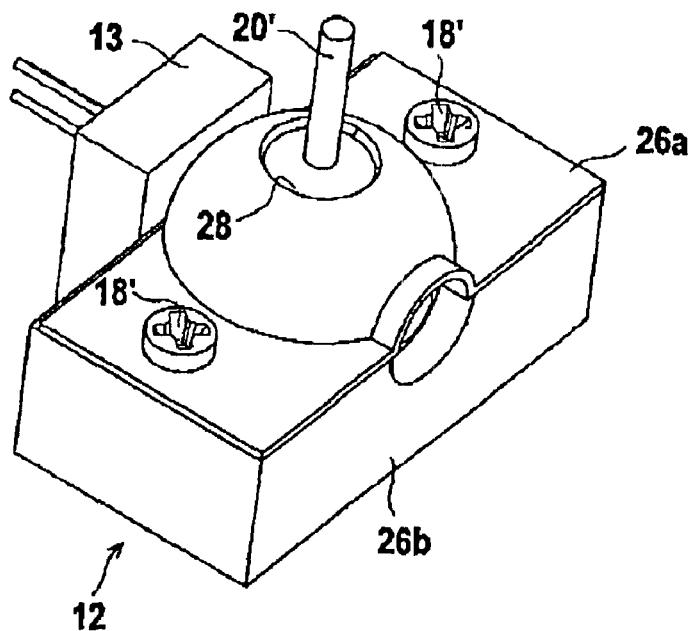
FIG. 5 illustrates a second exemplary embodiment of an adjustment device for an optical sensor.
Figure 6:
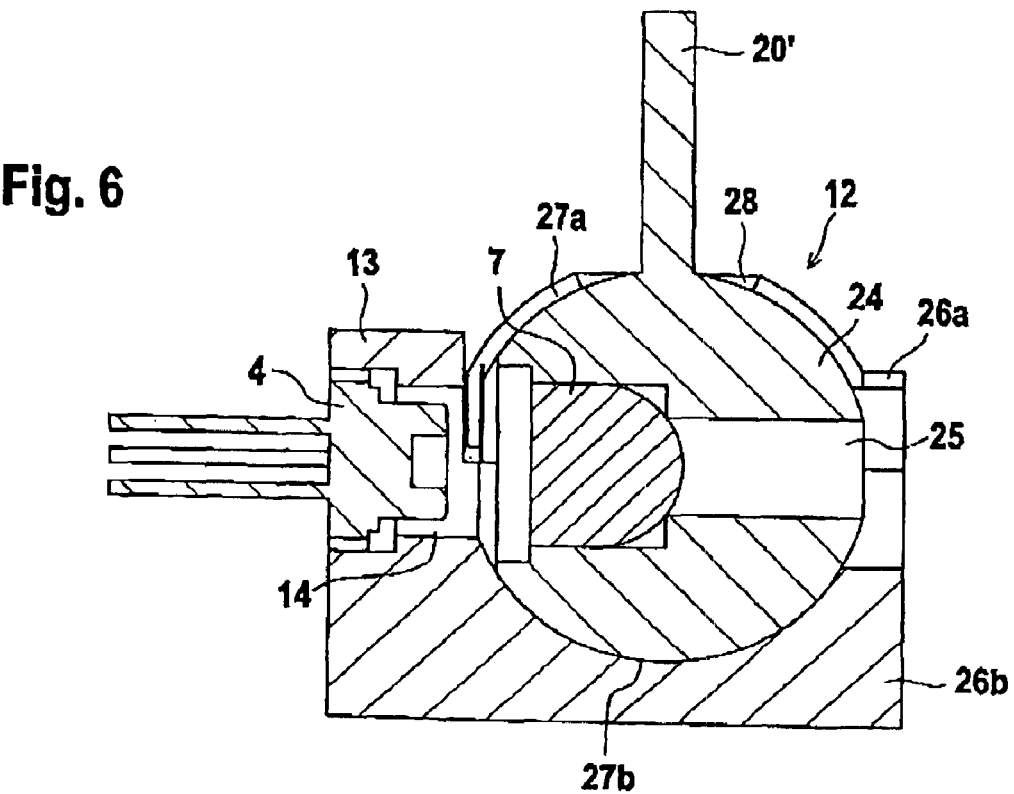
FIG. 6 is a longitudinal section through the adjustment device according to FIG. 5.

FIGS. 5 and 6 show a different embodiment of an adjustment device for an optical sensor 1. The transmitter 4 is again positioned inside an insert 13, wherein the insert 13 has a bore 14 for accommodating the transmitter 4. The optics holder 12 again holds the transmitting optics 7 and follows the insert 13 with the transmitter 4.

The optics holder 12 is provided with a spherical head 24, having a spherical outer surface. A bore 25 with the transmitting optics 7 disposed therein extends through the spherical head 24. The optics holder 12 furthermore has a housing, consisting of two housing halves 26a, 26b, which are secured to each other, fitted one on top of the other, with fixing screws 18'. Each housing half 26a, 26b has a spherical half shell 27a, 27b. The spherical half shells 27a, 27b complement each other to form a spherical receptacle with the spherical head 24 disposed therein. The upper spherical half shell 27a contains a circular opening 28 on the top. A lever 20' that is connected to a spherical head 24 and radially projects from the outer surface of the spherical head 24 extends through this opening 28. Alternatively, the lever 20' can also be inserted into a bore in the spherical head 24. The opening 28 has a smaller diameter than the lever 20', which functions as operating element.

To adjust the position of transmitting optics 7, the fixing screws 18' on the housing are loosened slightly. As a result, the spherical head 24 fits with only slight friction against the walls of the spherical half shells 27a, 27b and can be pivoted to the desired adjustment position by deflecting the lever 20'. Following this, the adjusted position of spherical head 24 is secured by tightening the fixing screws 18'. In principle, the holder inside the spherical half shells 27a, 27b can also be designed to be self-holding, so that the fixing screws 18' can be omitted. For this, at least one spherical half shell 27a, 27b is made from a material having springy characteristics, so that the spherical head 24 can be locked in place as a result of the spring force exerted by the spherical half shell 27a, 27b.

The transmitting optics 7 inside the spherical head 24 can be pivoted inside the housing in a vertical plane that extends perpendicularly to the optical axis for the transmitter 4. The distance between the transmitter 4 and transmitting optics 7 is adjusted by displacing the transmitter 4 in its position along the optical transmitter axis.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. An optical sensor comprising:
   a transmitter that emits light rays;
   transmitting optics installed downstream of the transmitter;
   an adjustment device operatively arranged for reversibly adjusting, in three spatial directions, the relative position of the transmitter and the transmitting optics, wherein the adjustment device comprises an optics holder in which the transmitting optics are positioned to pivot in a plane that is oriented perpendicularly to the optical axis of the transmitter, the optics holder comprising a spherical head, in which the transmitting optics are disposed, and is enclosed by two spherical half shells that form a receptacle in which the spherical head with the transmitting optics is positioned so as to pivot;
   a receiver that receives light rays; and
   an evaluation unit for evaluating the received signals that are present at the receiver output.

2. The optical sensor according to claim 1, wherein the spherical half shells are pressed against the spherical head with the fixing screws for fixing the position of the transmitting optics.

3. The optical sensor according to claim 1, wherein one spherical half shell is provided with an opening, and the sensor further comprises a lever connected to the spherical head and extending through the opening, wherein the lever functions as an operating element.

4. The optical sensor according to claim 1, wherein the transmitter is arranged to be displaced in the direction of an optical axis of the transmitter.

5. An optical sensor comprising:

a transmitter that emits light rays;

transmitting optics installed downstream of the transmitter;

an adjustment device operatively arranged for reversibly adjusting, in three spatial directions, the relative position of the transmitter and the transmitting optics, wherein the adjustment device comprises an optics holder in which the transmitting optics are positioned to pivot in a plane that is oriented perpendicularly to the optical axis of the transmitter, the optics holder comprising a support element for accommodating the transmitting optics, and two holder segments that adjoin the support element on the longitudinal sides;

a receiver that receives light rays;

an evaluation unit for evaluating the received signals that are present at the receiver output; and a first stationary holding part adjacent to the optics holder, wherein at least one holder segment of the two holder segments is disposed on the first stationary holding part, in a manner that the position of the at least one holder segment is adjustable.

6. The optical sensor according to claim 5, further comprising a second stationary holding part, and wherein one of the two holder segments is disposed on the first stationary holding part so that the one holder segment is displaceable in a plane oriented perpendicularly to an optical axis of the transmitter, and the second holder segment of the two holder segments is disposed on the second stationary holding part, in a maimer that the second holder segment rotates and is displaceable.

7. The optical sensor according to claim 6, wherein the one holder segment has a plate-shaped design and rests with its front on a flat contact surface of the first stationary holding part.

8. The optical sensor according to claim 7, wherein the first stationary holding part has a support surface and a recess that exits at the support surface, a bore extending through the one holder segment, and a lever that functions as an operating element extends through the bore of the one holder segment and engages in the recess in the stationary holding part for adjusting the position of the transmitting optics.

9. The optical sensor according to claim 8, wherein the bore has a cross section that increases continuously starting from the center of the one holder segment toward the exit openings at the bore's front and back.

10. The optical sensor according to claim 8, wherein the recess in the first stationary holding part is essentially hemispherical, and wherein the free end of the lever is arranged to pivot in the recess.

11. The optical sensor according to claim 6, further comprising a rotary head provided at a free end of the second holder segment, where the second holder segment is positioned on the second stationary holding part, in a manner that the second holder segment rotates and is displaceable.

12. The optical sensor according to claim 11, wherein the second stationary holding part is provided with an indentation that ends on a holding surface, in which the rotary head is positioned.

13. The optical sensor according to claim 12, wherein the indentation has a constant semi-circular cross section in a longitudinal axis direction, wherein its radius is adapted to the radius of the rotary head.

14. The optical sensor according to claim 13, wherein the longitudinal axis of the indentation extends essentially parallel to a longitudinal axis of the optics holder.

15. The optical sensor according to claim 6, further comprising a flexible element connecting a support element to the one holder segment, wherein the position of the transmitting optics in the direction of the optical axis of transmitter is adjusted by deflection of the support element relative to the one holder segment.

16. The optical sensor according to claim 15, wherein the optics holder is a molded plastic part, and wherein the flexible element is formed by a locally weakened section in the molded plastic part.

17. The optical sensor according to claim 15, wherein the deflection of the support element can be preset with an eccentric element.

18. The optical sensor according to claim 17, wherein the eccentric element is an eccentric plate that is actuated from the top, the outer surface of which rests against the back of the optics holder.

19. The optical sensor according to claim 18, wherein the rotary head on the second holder segment is pressed into the indentation in the second stationary holding part by the pressure exerted with the eccentric plate onto the optics holder.

20. The optical sensor according to claim 5, wherein the transmitter is positioned inside an insert, which is joined on the front by the optics holder.

21. The optical sensor according to claim 20, wherein the at least one holder segment is adjustably arranged between the insert and the first stationary holding part and is fixeable at this location in a preset adjustment position with the aid of a fixing screw.

* * * * *